United States Patent
Cain et al.

(10) Patent No.: US 9,254,528 B2
(45) Date of Patent: Feb. 9, 2016

(54) ADJUSTABLE DIE

(75) Inventors: Brandon M. Cain, Houston, TX (US); Todd Travis, Humble, TX (US); Eric Calzoncinth, Baytown, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 861 days.

(21) Appl. No.: 13/355,035

(22) Filed: Jan. 20, 2012

(65) Prior Publication Data

US 2013/0189042 A1    Jul. 25, 2013

(51) Int. Cl.
  *B23G 1/28* (2006.01)
  *B23G 5/10* (2006.01)
  *B23G 9/00* (2006.01)

(52) U.S. Cl.
  CPC *B23G 1/28* (2013.01); *B23G 5/106* (2013.01); *B23G 9/009* (2013.01); *Y10T 408/03* (2015.01); *Y10T 408/89* (2015.01)

(58) Field of Classification Search
  CPC ............ B21H 3/04; B23G 5/04; B23G 1/02; B23G 1/06; B23G 1/22; B23G 5/08; B23G 5/10; B23G 5/043; B23G 9/00; B23G 9/009; B23G 1/04; B23G 1/28; B23G 5/106; B23G 2200/141; Y10T 408/89
  USPC ............ 72/292, 17, 86, 96, 121, 467; 470/10, 470/185, 8, 66, 67, 80, 187; 408/25, 215, 408/221, 182, 209
  See application file for complete search history.

(56) References Cited

U.S. PATENT DOCUMENTS

| | | | | |
|---|---|---|---|---|
| 1,104,046 | A * | 7/1914 | Hines | 408/110 |
| 1,348,403 | A * | 8/1920 | Gericke | 408/163 |
| 1,481,191 | A * | 1/1924 | Elliott et al. | 470/69 |
| 1,488,270 | A * | 3/1924 | Miller | 408/203 |
| 2,087,084 | A * | 7/1937 | Cote | 408/142 |
| 2,700,166 | A | 1/1955 | McKenzie | |
| 3,956,787 | A | 5/1976 | Crumpacker | |
| 4,378,187 | A | 3/1983 | Fullerton | |
| 4,630,978 | A * | 12/1986 | Keiser et al. | 408/159 |
| 5,139,381 | A | 8/1992 | Lubreski et al. | |
| 5,427,488 | A * | 6/1995 | Fullerton et al. | 411/433 |
| 5,613,816 | A * | 3/1997 | Cabahug | 411/433 |
| 5,800,108 | A * | 9/1998 | Cabahug | 411/433 |
| 5,803,676 | A * | 9/1998 | Wienss | 408/1 R |
| 5,988,965 | A | 11/1999 | Fiorell et al. | |
| 6,361,260 | B1 * | 3/2002 | Schirrmacher | 411/433 |
| 6,712,574 | B1 * | 3/2004 | Roopnarine | 411/433 |
| 7,267,168 | B1 | 9/2007 | Sipos | |
| 8,047,923 | B2 | 11/2011 | Emerson | |

OTHER PUBLICATIONS

Examiner's Requisition received in corresponding Canadian Application No. 2,795,669, dated Mar. 7, 2014.
Zipnut Technology Threaded Fastners for Fire Rescue Aerospce Energy Nuclear Tooling Industries, ZipNut Technology, LLC, Nov. 28, 2011, available on the internet at http://www.zipnut.com/Zipnut-Technology.html.

* cited by examiner

*Primary Examiner* — Teresa M Ekiert
(74) *Attorney, Agent, or Firm* — Blank Rome LLP (57) ABSTRACT

A slip on nut and reverse cut die is provided for dressing the threads of a wellhead or other item. A nut is provided that may be slipped onto a threaded section, past any damaged threads, without engaging the threads of the threaded section. Once positioned on a threaded section the nut may be tightened as desired. When removing the nut the reverse edges of the nut may repair or even cut new threads into the threaded section.

16 Claims, 7 Drawing Sheets

ADJUSTABLE DIE

BACKGROUND

When producing hydrocarbons, as in many industries, it is necessary to fasten various items together. A long known method of fastening is through the use of threads, such as on a bolt and corresponding nut.

While nuts and bolts work very well there are some problems associated with their use such as very long threaded sections which may take more time than an operator cares to spend tightening a bolt or those instances the threads have been damaged preventing a nut from being easily threaded onto the threaded section.

A previous solution has been to utilize a zip nut, such as the product offered by FASTORQ BOLTING SYSTEMS™. Zip nuts are generally known in the art for rapid push-on mounting onto a threaded bolt, stud, or similar threaded structure where the nut is installed onto the bolt to a seated or nearly seated position with little or no rotational motion.

Such zip nuts are typically constructed to include a plurality of part-cylindrical, longitudinally separated nut segments which are mounted in a cylindrical array within an outer nut casing or housing. The nut segments are internally threaded to collectively define a spiral female thread for engaging a mating thread on an associated bolt or threaded section. One or more bias devices such as springs are wrapped about the nut segments to apply a radially inward force urging the nut segments into normal threaded engagement with the bolt or threaded section. The nut segments are allowed to displace radially outwardly when the nut is pushed in one axial direction over the associated bolt.

Accordingly, the zip nut can be displaced rapidly over the axial length of the bolt, with a non-rotational push-on action, to a seated position in axial abutment with a substrate. If further tightening of the nut is desired, a small amount of nut rotation can be accomplished by engaging the nut casing with a wrench or the like. Further tightening of the outer nut casing causing the nut segments to interact with an angled surface in the interior of the outer nut casing forcing the nut segments against the bolt or threaded section with increasing force as more torque is applied to the outer nut casing.

While zip nuts beneficially permit rapid nut mounting without requiring substantial nut rotation over the protruding free length of a bolt, such nuts do not always permit a similarly rapid pull-off removal from the bolt when disassembly is desired. Instead, it may be necessary to back-rotate the nut from the seated position, with such back-rotation continuing for the entire free length of the bolt until the nut is removed. In these instances the threaded section that was damaged may not be bypassed.

There exists, therefore, a significant need for an improved zip nut which can be mounted onto a bolt quickly and easily with a simple push-on action, and which is also adapted to repair the threaded section during removal. The present invention fulfills these needs and provides further related advantages.

SUMMARY

The present invention facilitates repairs to the threaded section during removal of the zip nut by utilizing the back edge of the zip nut's threaded section. By hardening and shaping the reverse edge of the zip nut as the operator removes the zip nut, in a manner similar to a standard nut, as the damaged threads are encountered the reverse edge of the zip nut acts as a die and dresses the damaged threads as the zip nut is worked past the damaged section.

By varying the diameter of the housing in relation to the nut segments the zip nut may be used on several diameters of bolts or threaded sections.

In some instances the housing may be replaced by a strap to bring the nut segments into contact with any portion of the bolt or threaded section that may be damaged.

Another embodiment may include slip-on die assembly with a housing having a bore therethrough and where the bore has a beveled internal surface. At least two nut segments form an inner sleeve. The inner sleeve has an interior, is rotationally fixed within the bore of the housing, has a variable diameter, and has a beveled exterior surface that corresponds to and is disposed within the beveled internal surface of the bore. The interior of the inner sleeve has inwardly facing threads to engage a bolt, each thread has a forward edge in a tightening direction and a reverse edge where the reverse edge has a cutting surface. Upon rotation of the housing in a tightening direction the threads engage the bolt to compress the inner sleeve's beveled exterior surface against the beveled internal surface of the bore to urge the inner sleeve from a first diameter to a second diameter. The diameter of the inner sleeve may vary in relation to the diameter of a threaded rod. The reverse edge cutting surface may have a sharpened edge such as a point, a chisel shape or a scallop shape. The housing may have any shape that may be gripped by a tool including parallel flat sides or a six sided hexagon.

Another embodiment may include a strap on die assembly having a threaded surface. The threaded surface has a reverse edge and the reverse edge has a cutting point. A strap is utilized to urge the threaded cutting surface into engagement with a rod. In certain instances the strap may be a chain, metal, a composite band, or a woven fiber such as cotton or carbon fiber.

The assembly may include a single threaded cutting surface or in order to keep at least one cutting surface in contact with the bolt being repaired, it may include at least two threaded cutting surfaces. The threaded cutting surfaces may be added or removed as a function of a rod diameter.

Another embodiment is a method of restoring a threaded surface where a housing is slipped over a threaded rod. The housing is turned in a tightening direction to engage a cutting surface with the threaded rod. Finally the threads in the threaded rod are repaired by turning the housing in a reverse direction.

The diameter of the inner sleeve varies in relation to the diameter of a threaded rod. The cutting surface is on the reverse edge of the inner sleeve and may have a sharpened edge such as a point, a chisel shape or a scallop shape. The housing may have any shape that may be gripped by a tool including parallel flat sides or a six sided hexagon.

As used herein the terms "tightening" may mean either a right hand or a left hand direction and generally describes the nut as it progresses onto a bolt or threaded section and "reverse" may mean either a left hand or right hand direction, and generally describes the nut as it is removed from a bolt or threaded section. The term "bolt" may be used interchangeably with "threaded section."

DETAILED DESCRIPTION OF EMBODIMENT(S)

The description that follows includes exemplary apparatus, methods, techniques, and instruction sequences that embody techniques of the inventive subject matter. However, it is understood that the described embodiments may be practiced without these specific details.

Figure 1:
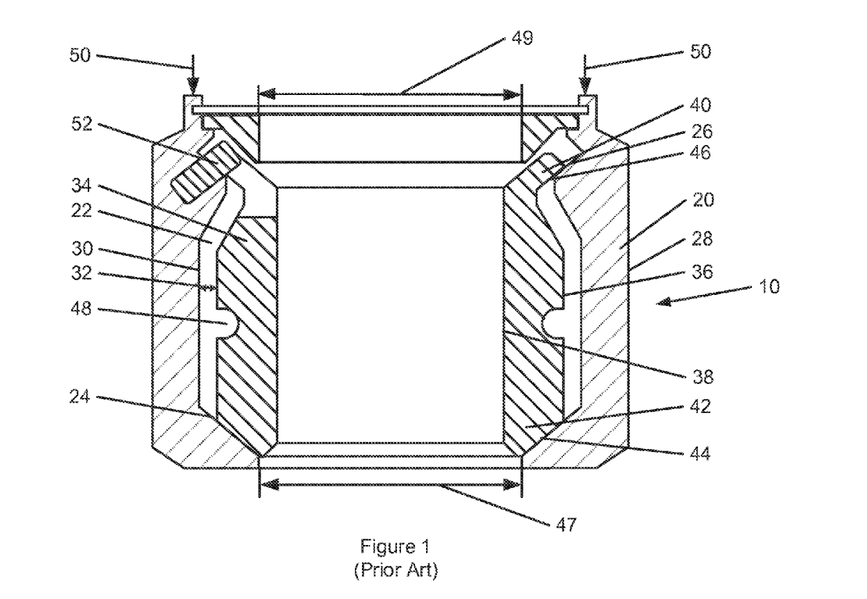
FIG. 1 depicts a cross-section of a zip nut.
Figure 2:
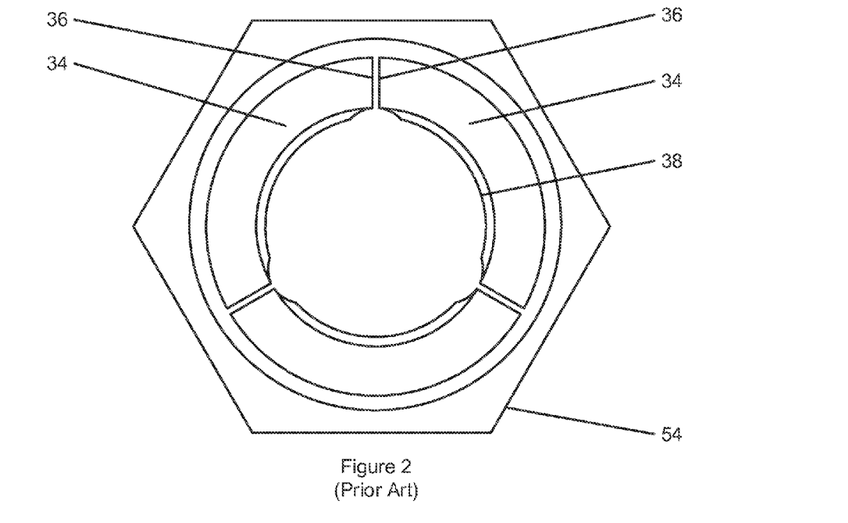
FIG. 2 depicts a top view of the zip nut in FIG. 1.

FIGS. 1 and 2 depict a prior art zip nut. In FIG. 1 the zip nut 10 typically has a casing 20. The casing has an internal cavity 22. At the lower end of the internal cavity 22 the casing 20 has a lower internal shoulder 24. At the upper end of the internal cavity 22 the casing 20 has an upper internal shoulder 26. The casing outer edge 28 is typically arranged so that it may be gripped by a wrench or other device that may apply torque to the zip nut 10. The casing includes an inner wall 30 that is spaced at some distance 32 from the outer edge 36 of the nut segment 34. The distance 32 is sufficient to allow the nut segment 34 to expand radially when the zip nut 10 is pushed onto a bolt or threaded section.

FIG. 2 uses the same reference numerals for the same parts as used to describe FIG. 1. As depicted in FIG. 2, typically there are at least two nut segments 34. The nut segments 34 have edges 36 that cooperate so that when the segments are brought together inside of the internal cavity 22 of the casing 20 the nut segments 34 form a cylinder. Typically there are threads cut on the interior surface 38 of the cylinder formed by the nut segments 34.

Referring again to FIG. 1, the nut segments 34 each have an upper end 40 and a lower end 42. The lower end 42 has an outer surface 44 that is angled. The upper end 40 also has an outer surface 46 that is angled. A circumferential groove 48 is cut into the outer surface of the nut segments 34 to provide space for a bias device typically a spring (not shown). The bias device provides force to keep the nut segments 34 in contact with a bolt or other threaded surface. However, the bias device does not provide enough force to lock the nut segments 34 against a bolt. When downward axial force shown as arrows 50 is applied the nut segments 34 overcome the force provided by the bias device so that the nut segments 34 expand radially up to a maximum amount provided by distance 32 thereby allowing the zip nut 10 to move over the bolt.

Once the zip nut 10 is moved down to the desired position it may be necessary to apply torque in a tightening direction to the external shoulders 54 of casing 20 in order to apply additional axial force to the bolt, such as when using the bolt and zip nut 10 to secure a flange. To apply torque to the nut segments 34 a key 52 is provided so that torque applied to the external shoulders 54 of casing 20 is transferred to the nut segments 34 via key 52.

With the zip nut 10 pushed onto the bolt to the desired position the threads 38 of the nut segments 34 are pulled against the bolt threads by the bias device in circumferential groove 48. As the torque is applied to the external shoulders 54 in a tightening direction the nut segments 34 move downward as a cooperative function of the bolt threads and the threads 38 of the nut segments 34. The casing lower internal shoulder 24 and upper internal shoulder 26 have angles that cooperate with, respectively, the lower angled outer surface 44 and the upper angled outer surface.

As the nut segments 34 move downward, the lower angled outer surface 44 and the upper angled outer surface of the nut segment are forced against the lower internal shoulder 24 and the upper internal shoulder 26 of the casing, which in turn forces the nut segments 34 inward against the bolt. As more torque is applied to the external shoulders 54 the nut segments 34 are forced against the bolt with increasing pressure.

When reversing the zip nut 10 to remove it from the bolt or threaded section torque is applied to the external shoulders 54 to rotate the zip nut 10 in a reverse direction. As the zip nut casing 20 is reverse rotated the key 52 applies the reverse torque to the nut segments 34 causing the nut segments 34 to rotate in the reverse direction. As the nut segments 34 rotate in the reverse direction the nut segments 34 move upward as a cooperative function of the bolt threads and the threads 38 of the nut segments 34. However, the bias device in the circumferential groove 48 continues to maintain the threads 38 of the nut segments 34 in engagement with the threads of the bolt.

As the nut segments 34 move upward, the nut segments 34 are no longer forced inward against the bolt by the casing lower internal shoulder 24 and upper internal shoulder 26 via their interaction with the lower angled outer surface 44 and the upper angled outer surface 46.

While the nut segments 34 are no longer in contact with the casing 20 the zip nut 10 is removed by reverse rotation for the length of the bolt and typically is not removed by pulling the zip nut 10 axially off of the bolt.

In the event that the zip nut is pulled upward to remove the zip nut 10 from the bolt, the threads 38 of the nut segments 34 that are engaged with the threads on the bolt cause the nut segments 34 to move downward in relation to the casing 20. As the nut segments 34 move downward the lower angled outer surface 44 and the upper angled outer surface of the nut segment are forced against the lower internal shoulder 24 and the upper internal shoulder 26 of the casing, which in turn forces the nut segments 34 inward against the bolt. As more upward axial force is applied to the zip nut 10 in order to remove the zip nut 10 from the bolt the nut segments 34 are forced against the bolt with increasing pressure. Therefore the zip nut 10 must be reverse rotated off of the bolt.

Typically, in wellbore and other operations when the zip nut 10 is being removed time is not as critical as when the zip nut 10 is initially used. The zip nut 110 as depicted in FIG. 3 is similar to the zip nut depicted in FIG. 2.

Typically there are at least two nut segments 134. The nut segments 134 have edges 136 that cooperate so that when the segments are brought together inside of the internal cavity 122 of the casing 120 the nut segments 134 form a cylinder. Typically there are threads cut on the interior surface of the cylinder formed by the nut segments 134. The threads 138 are constructed of a material that is harder than the bolt. However, any treatment that would allow the threads 138 to be used as a die, such as heat treating, shot peening, carburization, or other means of hardening the material could be used.

The threads 138 have a reverse edge, generally 180. The reverse edge has a cutting point 182 and an undercut 184. The cutting point 182 is typically situated on the innermost edge of the threads 138 so that it will engage the damaged thread on the bolt without riding over the bolt thread failing to dress the damaged section.

Figure 3:
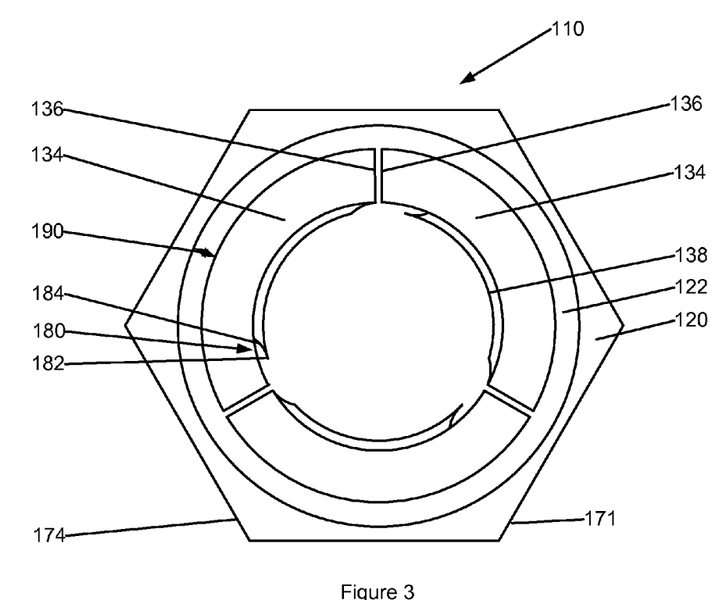
FIG. 3 depicts a top view of a six sided zip nut with a thread cutting reverse edge.
Figure 3A:
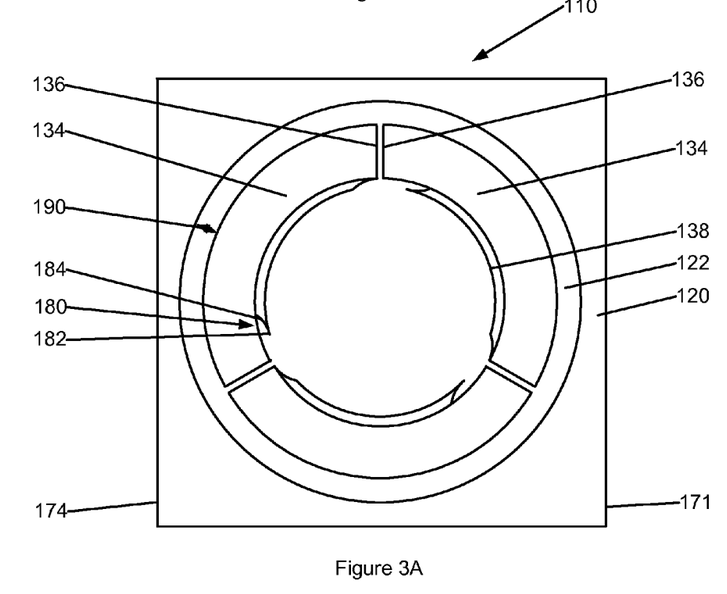
FIG. 3A depicts a top view of a zip nut having at least two parallel sides.

As can be seen in FIG. 3 there is some distance 190 between the nut segments 134 and the casing 120. This distance 190 provides the nut segments clearance so that the nut segments 134 may move radially outward when the zip nut 110 is pushed down over a bolt or threaded section. A single zip nut 134 may be used to secure or dress multiple diameters of threaded sections or bolt provided that the thread pattern is compatible, distance 190, and openings 47 and 49 (FIG. 1) allow sufficient clearance for a bolt to be inserted.

When the zip nut 110 is tightened in a right hand pattern typically force is applied generally against the corners of the housing 171. When the zip nut 110 is reversed typically force is applied generally against the corners of the housing 174.

Figure 4:
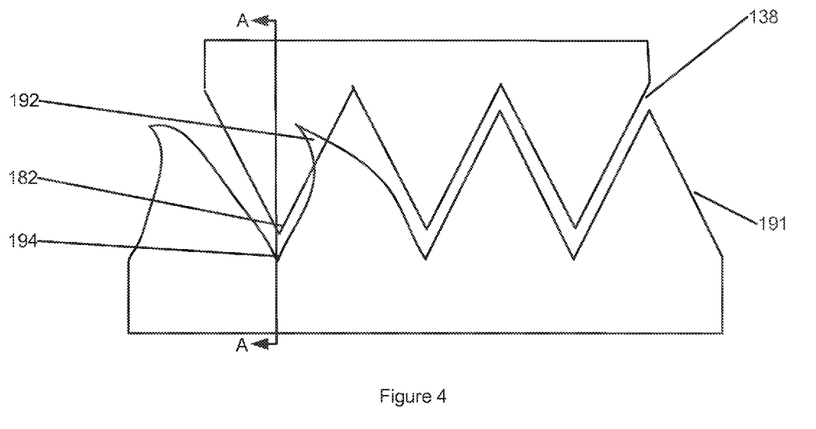
FIG. 4 depicts an end view of a cutting surface interacting with a damaged thread section.
Figure 5:
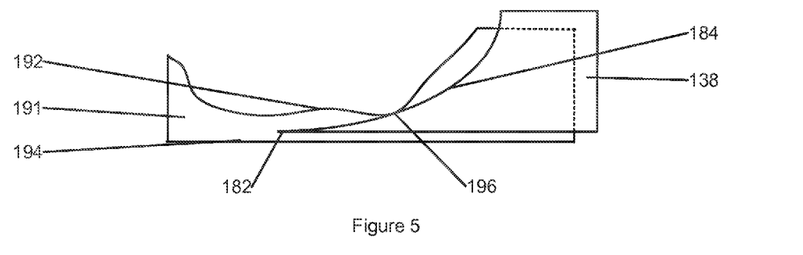
FIG. 5 depicts a side view of a cutting surface interacting with a damaged thread section.

FIGS. 4 and 5 together depict cutting points 182 of the zip nut 110 in FIG. 3 engaged with a damaged thread section. The bolt thread 191 has an upper point 192 engaged with the nut segment thread 138. Where FIG. 5 is a cross-sectional view at A-A. The cutting point 182 of the threads 138 is undercut 184 so that the cutting point 182 will move between the upper point 192 of the bolt thread that is damaged and the lower point 194 of the bolt thread 191. As the cutting point 182 moves under the upper point 192 of the bolt thread 90 the undercut 184 will eventually come into contact with a portion of the damaged section 192 of the bolt thread 191, such as at the contact zone 196. The undercut 184 and consequently the cutting point 182 will then be pushed deeper into the lower point 194 of the bolt thread 191 thereby preventing the nut segment 138 from riding over the bolt thread 191 without dressing it. While all nut segments 138 are depicted as having a cutting point 182 a cutting point may only be present on a single nut segment 138.

Figure 6:
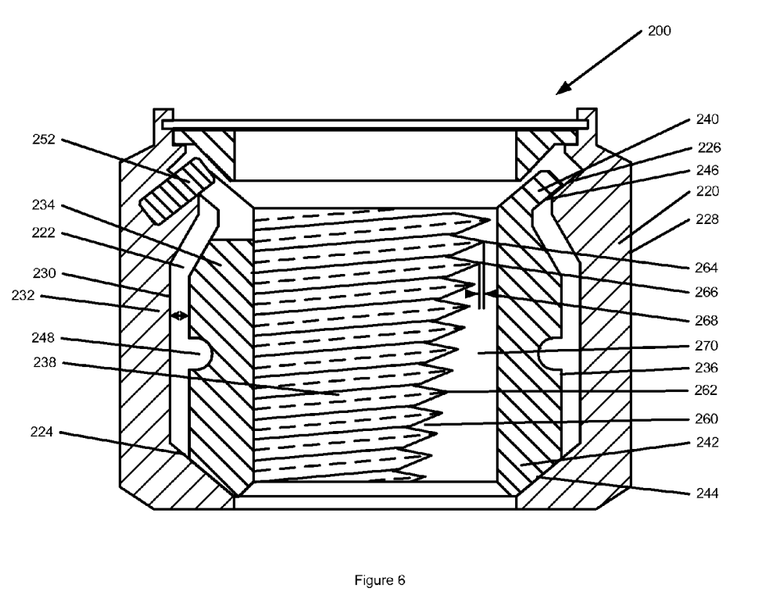
FIG. 6 depicts a cross-section of a zip nut detailing the reverse cutting surface and shavings channel.

A thread cutting zip nut 200 as depicted in FIG. 6, may be constructed to allow metal shavings from the thread repairing operation to be removed from the zip nut or otherwise provided for. Some possibilities are to provide a channel in the zip nut to collect metal shavings, packing the zip nut with a viscous material such as a glue or grease to catch shavings, or providing a channel to allow the shavings to fall out of the zip nut or otherwise be removed.

A channel 270 is formed in a zip nut 200 to allow shavings to fall out of the zip nut 200. A single nut segment 234 is depicted having a threaded section 238. On the reverse edge 260 of the threads in the threaded section 238 is a cutting point 262. In the configuration depicted a cutting point 266 is offset a small distance 268 from the cutting point 264 just above it. By offsetting each cutting point or thread the cumulative effect is form a channel 270 to allow shavings to fall out of the lower end of the zip nut 200.

Figure 7:
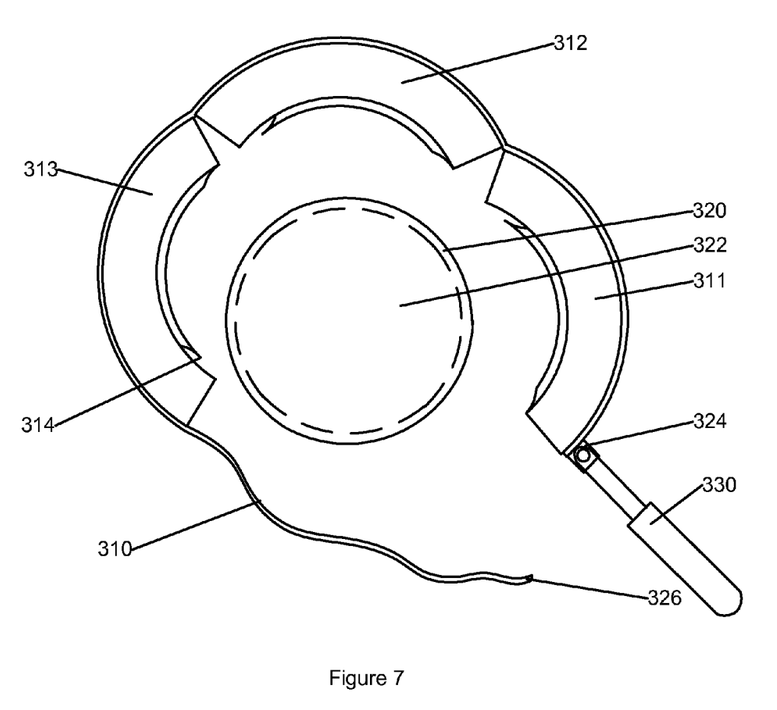
FIG. 7 depicts a top view of multiple nut segments held in place by a strap.

As depicted in FIG. 7, other embodiments may include a strap 310 to maintain the cutting points 314 on each of nut segments 311, 312, 313 in cutting engagement with the threads 320 that are formed around the exterior of bolt 322. The strap 310 may be attached to each nut segment 311, 312, 313 to facilitate positioning the nut segments 311, 312, 313. The ends of the strap 326 and 324 may be used to apply tension to the strap 310. The strap 310 may be metallic, a chain, cotton fiber, carbon fiber, or any other flexible material or system. Handle 330 may be used to apply tension to strap 310. Handle 330 may also be used to apply torque through strap 310 to the nut segments 311, 312, 313 causing the cutting points 314 to repair the threads on the bolt or threaded section.

A depicted in FIG. 7 each nut segment 311, 312, 313 is not restricted by a housing around the exterior of the nut segments 311, 312, 313 causing the nut segments 311, 312, 313 to have a variable diameter, as a result, the nut segments 311, 312, 313, when used in conjunction with a strap 310, may be used to secure or dress multiple diameters of threaded sections or bolts provided that the thread pattern is compatible. Nut segments such as nut segments 311, 312, 313 may be added or removed depending upon the bolt or threaded section's diameter in order to facilitate maintaining engagement between a cutting point 314 and the bolt or threaded section 320.

Figure 8:
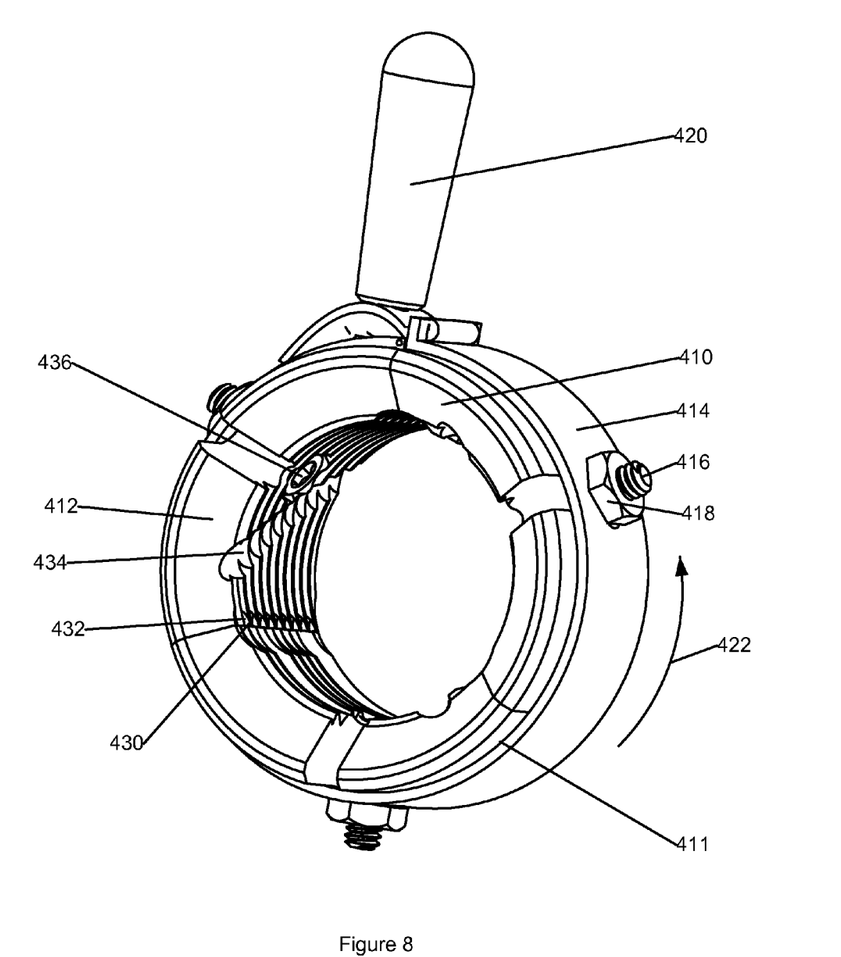
FIG. 8 depicts an isometric view of multiple nut segments held in place by a strap.

FIG. 8 depicts an alternate arrangement where several nut segments 410, 411, 412 are attached to strap 414 via bolt 416 and nut 418. The bolt 316 is prevented from protruding into the interior area formed by the nut segments 410, 411, 412 by a recess 436 in each nut segment 410, 411, 412. Handle 420 may be used to apply tension to strap 414 causing the strap to force the nut segments inward as well as to turn the nut segments 410, 411, 412 in a counterclockwise or reverse direction as shown by arrow 422.

Figure 9:
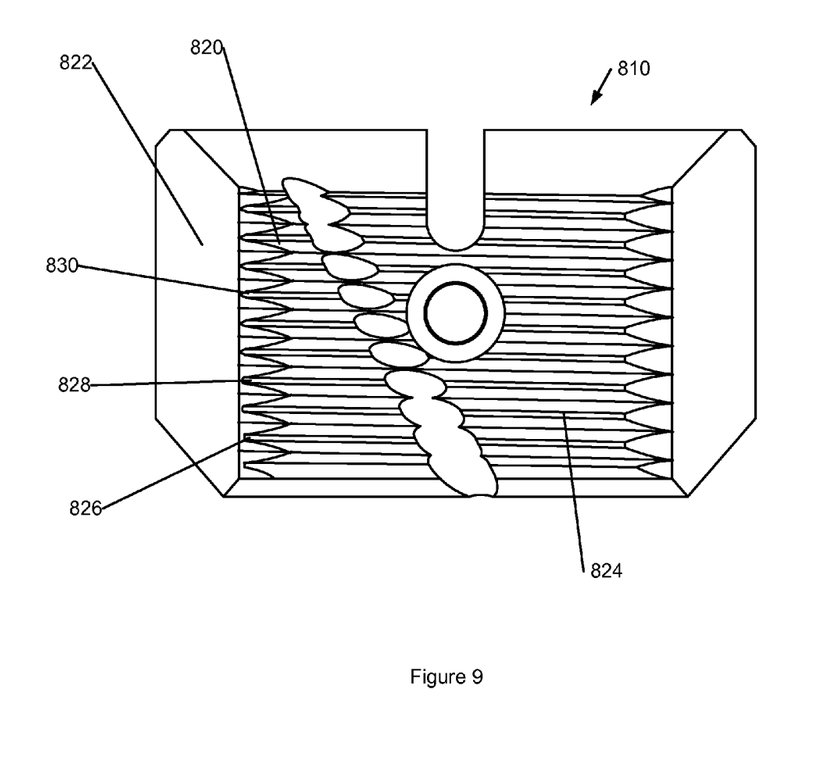
FIG. 9 depicts a side view of a nut segment detailing the reverse edge cutting surfaces.

When the nut segments 410, 411, 412 are engaged with a bolt and rotated in a reverse direction the cutting edge 330 engages the bolt to cut or repair a damaged thread. A groove 434 is provided to intercept shavings that may be produced by cutting edge 430 as it interacts with a threaded sections FIG. 9 depicts a nut segment 810 that has several different cutting surfaces 820 on the reverse edge 822 of the threads 824. The bottommost two cutting surfaces are flat nosed chisel points 826, towards the middle are rounded scalloped 828 cutting surfaces, the upper cutting surfaces are points 830. Typically, all of the cutting surfaces 820 on a single nut segment 810 will be of the same type.

While the embodiments are described with reference to various implementations and exploitations, it will be understood that these embodiments are illustrative and that the scope of the inventive subject matter is not limited to them. Many variations, modifications, additions and improvements are possible. For example, the implementations and techniques used herein may be applied to secure any member at a construction site, a wellsite, or in any instance where a threaded member needs repair.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A slip-on die assembly comprising:
a housing having a bore therethrough,
wherein the bore has a beveled internal surface;
at least two nut segments forming an inner sleeve having an interior;
wherein the inner sleeve is rotationally fixed within the bore of the housing;
wherein the inner sleeve has a variable diameter;
wherein the inner sleeve has a beveled exterior surface that corresponds to and is disposed within the beveled internal surface of the bore;
the interior of the inner sleeve having inwardly facing threads to engage a bolt, each thread having a forward edge in a tightening direction and a reverse edge;
wherein the reverse edge has a cutting surface offset from a cutting surface on a thread above so as to form a channel to allow shavings to fall out of the lower end of the slip on die assembly; and wherein upon rotation of the housing in a tightening direction the threads engage the bolt to compress the inner sleeve beveled exterior surface against the beveled internal surface of the bore to urge the inner sleeve from a first diameter to a second diameter.

2. The slip-on die of claim 1 wherein the diameter of the inner sleeve varies in relation to the diameter of a threaded rod.

3. The slip-on die of claim 1 wherein the cutting surface is hardened.

4. The slip-on die of claim 3 wherein the cutting surface is sharpened to a point.

5. The slip-on die of claim 3 wherein the cutting surface is sharpened to a chisel.

6. The slip-on die of claim 3 wherein the cutting surface is sharpened to a scallop.

7. The slip-on die of claim 1 wherein the housing has six sides.

8. The slip-on die of claim 1 wherein the housing has at least two parallel sides.

9. A method of restoring a threaded surface comprising,
slipping a slip-on die assembly over a threaded rod, the slip on die assembly comprising:
a housing having a bore therethrough, the bore having a beveled internal surface; and
at least two nut segments forming an inner sleeve having an interior, wherein the inner sleeve is rotationally fixed within the bore of the housing, wherein the inner sleeve has a variable diameter, and wherein the inner sleeve has a beveled exterior surface that corresponds to and is disposed within the beveled internal surface of the bore;
wherein the interior of the inner sleeve has inwardly facing threads to engage a bolt, each thread having a forward edge in a tightening direction and a reverse edge, wherein the reverse edge has a cutting surface offset from a cutting surface on a thread above so as to from a channel to allow shavings to fall out of the lower end of the slip on die assembly, and wherein rotation of the housing in a tightening direction causes the threads to engage the bolt to compress the inner sleeve beveled exterior surface against the beveled internal surface of the bore to urge the inner sleeve from a first diameter to a second diameter;
turning the housing in a tightening direction to engage a cutting surface with the threaded rod; and
restoring threads in the threaded rod by turning the housing in a reverse direction.

10. The method of restoring a threaded surface of claim 9 wherein the diameter of the inner sleeve varies in relation to the diameter of a threaded rod.

11. The method of restoring a threaded surface of claim 9 wherein the cutting surface is sharpened.

12. The method of restoring a threaded surface of claim 9 wherein the cutting surface is sharpened to a point.

13. The method of restoring a threaded surface of claim 9 wherein the cutting surface is sharpened to a chisel.

14. The method of restoring a threaded surface of claim 9 wherein the cutting surface is sharpened to a scallop.

15. The method of restoring a threaded surface of claim 9 wherein the housing has six sides.

16. The method of restoring a threaded surface of claim 9 wherein the housing has at least two parallel sides.

* * * * *